Oct. 14, 1958 H. MIELKE 2,856,529

OSCILLATOR SYNCHRONIZATION SYSTEM

Filed Dec. 26, 1956

Inventor:
Horst Mielke
By [signature] Patent Agent

United States Patent Office 2,856,529
Patented Oct. 14, 1958

2,856,529

OSCILLATOR SYNCHRONIZATION SYSTEM

Horst Mielke, Berlin-Lichterfelde, Germany, assignor to Telefunken G. m. b. H., Berlin, Germany Application December 26, 1956, Serial No. 630,698
4 Claims. (Cl. 250—36)

This invention relates to a control system for the automatic synchronization of the frequency of an oscillator to a selected harmonic of a fundamental frequency and, more particularly, relates to tuning the oscillator while preventing synchronizing of the oscillator at an erroneous frequency.

Control systems have been known in which the frequency of an oscillator is automatically synchronized with a standard oscillation fed to the system when the frequency of the comparison oscillation is sufficiently close to the oscillator frequency. By pre-adjusting the tuning, the frequency of the oscillator may be roughly adjusted to a frequency selected from a plurality of given frequencies, preferably from the spectrum of harmonics of fundamental oscillations, whereupon a fine-tuning device takes over the automatic precision adjustment of the oscillator frequency to lock it in with the selected standard frequency. The fine-tuning control means provided for this purpose may, for instance, be a reactance tube controlled by a voltage control means and connected across the frequency determining tuned circuit of the oscillator. This fine-tuning control means may additionally be equipped, if desired, with a mechanical adjustment of one of the components in the oscillator tuned circuit, as for instance a motor fed from a power network, to extend the range of adjustment of the reactance tube. The control voltage is derived from the frequency by means of a special control voltage generator, and consists of an alternating voltage corresponding with the difference frequency and/or a direct voltage, the polarity of which depends upon the phase of the compared oscillations in the case where the frequency difference becomes zero. This control voltage is capable of locking into synchronism with the aid of the fine-tuning means the oscillator frequency with the standard frequency selected by the rough setting of the oscillator tuning. Such a system, which is described in French Patent 971,872 has a great disadvantage. In practical use, the stable lock-in frequencies for the oscillator in such a system not only correspond with the spectrum components of the fundamental frequency gneerator, but there are also stable lock-in frequencies present for frequencies corresponding with the arithmetic mean between two spectrum components. In case of such mean frequencies, the difference frequency between the oscillator frequency and the lower adjacent spectrum component equals the difference frequency between this oscillator frequency and the upper adjacent spectrum component. As a result of this calculation, the difference oscillations of equal frequency obtained in the mixing stage lie in opposite phases with respect to one another so that they cancel each other. Thus, the alternating voltage component of the control voltage will become zero not only in the event of synchronization with one of the spectrum components, but also for the mentioned intermediate values of frequency at which the difference oscillations produced by two adjacent spectrum components are equal and cancel one another. This performance explains the tendency of such system to lock in on such intermediate values by a kind of pseudo-synchronization which, firstly is undesired, and secondly does not possess the same quality of frequency stability as results from synchronization with the spectrum frequencies themselves.

Furthermore, it has been known, as shown in German Patent 933,638, to synchronize on the intermediate frequencies, whereby a system similar as that in the mentioned French patent is used. If such synchronization to an intermediate frequency is to be avoided, additional devices are necessary permitting the equality of the control voltages in the case of synchronization to a spectrum frequency, but preventing such equality in case of synchronization to an intermediate frequency.

It is an object of the present invention to provide such means.

It is another object of the present invention to superimpose on the control voltage an auxiliary alternating voltage of such selected frequency and amplitude that an automatic synchronization of the oscillator frequency with a frequency corresponding with the arithmetic mean between two adjacent spectrum frequencies is avoided.

Still further objects and the entire scope of applicability of the present invention will become apparent from the detailed description given hereinafter; it should be understood, however, that the detailed description and specific example, while indicating a preferred embodiment of the invention, are given by way of illustration only, since various changes and modifications within the spirit and scope of the invention will become apparent to those skilled in the art from this detailed description.

Figures 1, 2, 3:
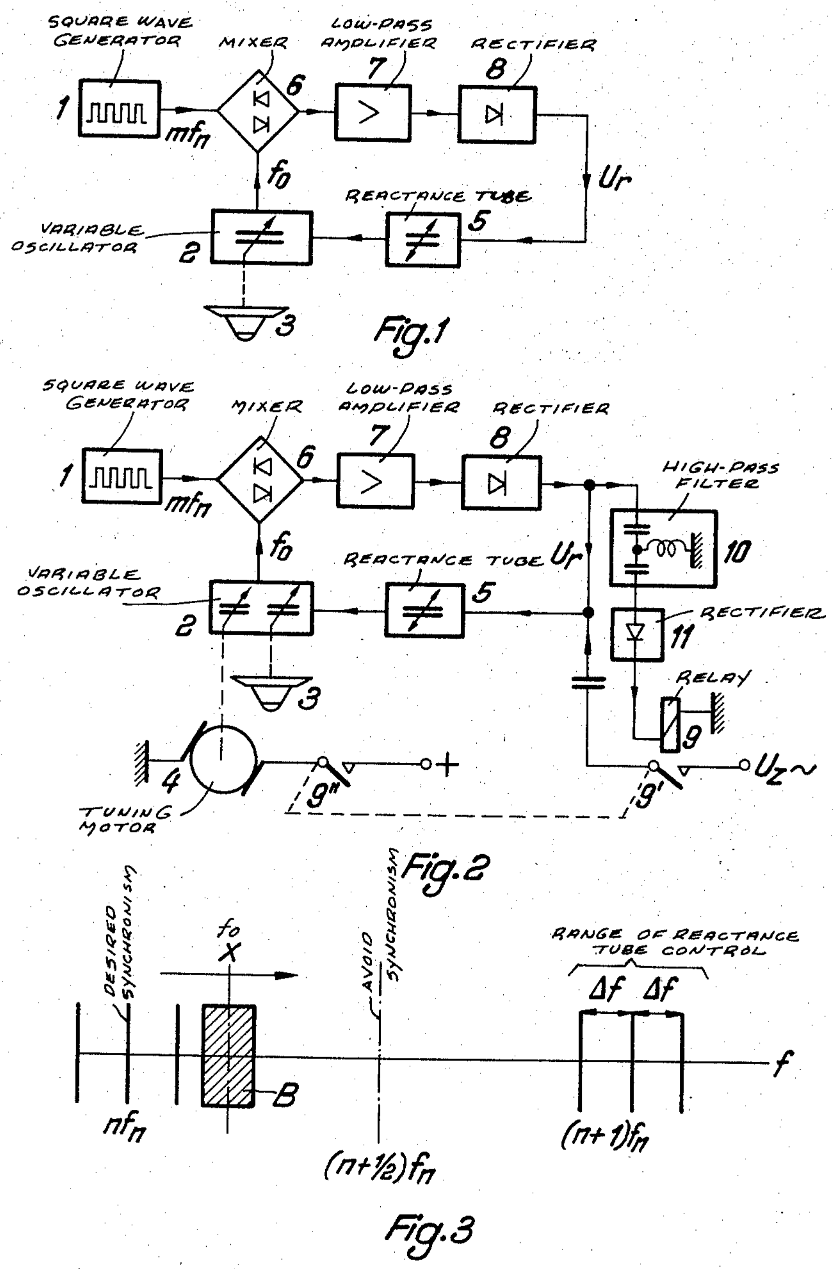
Figure 1 shows a circuit or block diagram of a prior art system, such as described in French Patent 971,872, mentioned in the foregoing.
Figure 2 is a similar circuit or block diagram showing the improvement according to the present invention.
Figure 3 is a graphical presentation showing a frequency to which the oscillator is to be locked and also showing an intermediate frequency at which synchronism is to be avoided.

The same parts in Figures 1 and 2 have been given the same reference characters.

With reference to the prior art circuit of Figure 1, 1 denotes a standard frequency generator producing a predetermined fundamental frequency having a pulse-like wave-shape so that its spectrum of harmonics reaches up to very high order. The oscillation spectrum furnished by the generator is denoted by $mf_n$. The oscillation frequency $f_0$ of a freely tunable oscillator 2 can be selected over an extended frequency range by means of a tuning condenser adjustable with the aid of a knob 3. The oscillation spectrum $mf_n$ and the oscillator frequency $f_0$ are fed to the mixing stage 6 in which all of the difference frequencies between the individual frequencies of the spectrum and the instantaneous freely adjustable oscillator frequency $f_0$ are formed. In a low-pass amplifier 7 the difference frequencies are amplified and those having a smaller frequency than half of the difference between two spectrum components are filtered out. As a result of this filtering out of the difference frequencies from the mixing stage, only those frequencies are used for the generation of a control voltage which are derived from the spectrum frequency closest to the instantaneous frequency $f_0$ of the oscillator. The oscillator 2 is frequency-modulated with the closest difference frequency via the control circuit including the amplifier 7, the rectifier 8 and the reactance tube 5, by means of the control voltage $U_r$. Thus, the oscillator 2 is synchronized with a spectrum frequency selected during rough-tuning. When the frequency $f_0$ of the oscillator 2, due to this frequency modulation, coincides with the value $mf_n$ to which its frequency is to be synchronized, the difference frequency formed in the mixing stage 6 becomes zero and there remains a D. C. component of control voltage depending upon the relative phase condition of the two oscillations supplied to the mixing stage, said direct control voltage locking the oscillator 2 to the desired standard frequency $mf_n$.

In the system according to the invention, shown in Figure 2, a tuning motor 4 is provided in addition to the arrangement shown in Figure 1, said motor 4 actuating a rotary tuning condenser within the tuned-circuit of the oscillator 2, so as to bring the frequency into synchronism zero within the range of the control device. After this is accomplished, the motor drive is switched off by means of a switch or contact 9″. Such combinations of an electronic frequency control with a mechanically-driven frequency control has been known per se. Therefore, the additional use of the motor drive in Figure 2 does not by itself satisfy the object of the present invention.

According to this invention, the control voltage $U_r$, shown in Figure 2, is superimposed on an auxiliary sine wave voltage $U_z$ via a switch or contact 9′. As a result of this, the control system does not become synchronized with the undesired in-between frequencies, but only a synchronization with the spectrum frequencies themselves is effected.

The operation of such synchronization will be described with reference to Figure 3, in which $nf_n$ is that spectrum frequency to which the oscillator 2 is to be locked. The next higher spectrum frequency on the frequency scale $f$ is denoted by $(n+1)f_n$. $\Delta f$ is the range of control of the reactance tube 5. The frequency $(n+\frac{1}{2})f_n$ is in the center between the two mentioned spectrum frequencies and is the frequency, at which a pseudo-synchronization is to be avoided. It is assumed that the frequency $f_o$ of the oscillator 2 corresponds with the value X when the system is turned on. Consequently, this frequency is not within the range in which the electronic control can effect a synchronization. Therefore, the additional action of the tuning motor 4 is necessary, said motor being operated by the switch of contact 9″. In the illustration, it is assumed that the direction of rotation of the motor and the tuning device operated by the motor is such that the frequency of the oscillator 2 is dragged in the direction indicated by the arrow, i. e., away from the desired synchronization frequency. During this operation, the difference frequency between $nf_n$ and the instantaneous value of $f_o$ is formed in the mixing stage 6 and $f_o$ is frequency-modulated via the control circuit by means of this difference frequency. Thus, the oscillator 2 generates a frequency band B traveling in the direction of the in-between frequency between the two spectrum frequencies. The alternating voltage component of the control voltage $U_r$ will become zero at this in-between frequency, i. e., at the frequency $(n+\frac{1}{2})f_n$, so that the frequency modulation of the oscillator 2 by this alternating voltage component ceases. The frequency of the oscillator 2 is now frequency-modulated by the auxiliary sine wave voltage $U_z$, so that in contrast with the arrangement of Figure 1, the oscillator 2 at this in-between position furnishes a frequency band of finite width so that the difference frequencies obtained by mixing this frequency band with the spectrum frequency $nf_n$ will not be entirely cancelled by those frequencies which are formed by mixing with the spectrum component $(n+1)f_n$. Though the alternating component of $U_r$ has a minimum at this position, it does not equal zero at this position. The motor 4 has brought the control device beyond the dangerous point before the control device was able to switch off the motor 4.

The tuning by the motor is at this point still running in the wrong direction and is between the frequencies $(n+\frac{1}{2})f_n$ and $(n+1)f_n$. The maximum detuning range of the rotary tuning condenser is now exhausted and with the same direction of rotation, the tuning returns in the reverse direction along the same path. The tuning moves in the manner described with the aid of the auxiliary alternating voltage $U_z$ beyond the dangerous intermediate point and continues moving toward the desired frequency $nf_n$ in the desired direction. The difference frequency formed from $nf_n$ and $f_o$ becomes gradually smaller so that, finally, it is below the cut-off frequency of a high-pass filter 10, so that it will not pass the latter. When this occurs, no eregizing current for the relay 9 is furnished through rectifier 11, and the working contact 9′ of the relay 9 is opened. As a result of this, the auxiliary sine wave alternating voltage $U_z$ is switched off at the proper time. Said auxiliary voltage might otherwise disturb the synchronizing of the system to the desired spectrum frequency. Simultaneously, the motor 4 can be switched off, since its action is no longer needed. This can be accomplished by a second contact on the same relay 9 which controls the auxiliary alternating voltage $U_z$. The frequency $f_o$ of the oscillator 2 is now within the range of the reactance tube circuit and is synchronized thereby to the desired spectrum frequency $nf_n$ in the manner described with reference to Figure 1.

According to Figure 2, the device switching off the auxiliary alternating voltage when the frequency difference between the oscillator frequency and a selected spectrum frequency has been reduced to a predetermined minimum value is combined with the switching means controlling the operation of the adjusting motor 4, when the tuning to the desired predetermined frequency is approached. As a result of this, it is necessary to provide only one electrical high-pass filter 10, a rectifier 11 and a switch-operating relay 9. It is also possible to separate the control of these circuit components, particularly, if it is desired to actuate the switching of the auxiliary alternating voltage at a different value of the difference frequency from the value at which the switching on and off of the motor takes place.

I claim:

1. A circuit for the automatic synchronization of the frequency of an oscillator to a selected harmonic of a fundamental frequency to which the oscillator has been roughly tuned, comprising a reactance tube in fine-control of the frequency of said oscillator; means for deriving a control voltage based on a difference frequency obtained by comparison of the oscillator frequency with harmonic frequencies; and means to prevent the oscillator frequency from being synchronized to a mean frequency located between the selected harmonic and an adjacent non-selected harmonic, comprising filter means responsive to difference frequencies outside the range of control of said reactance tube; switch means turned on by said filter means; an oscillator tuning means for tuning the oscillator back and forth across the selected harmonic at a slow rate over a wide frequency range and said tuning means being turned on by said switch; and an auxiliary sweep voltage alternating at a rate high in comparison with said slow rate and superimposed on said control voltage to the reactance tube, said auxiliary voltage being present when said switch means is turned on and sweeping the oscillator frequency rapidly back and forth over a narrow range to provide a band of difference frequencies and thus to prevent the control voltage from becoming and remaining zero by cancellation of two equal difference frequencies at said mean frequency.

2. In a circuit as set forth in claim 1, said switch means comprising at least one relay having two separate contact paths, one path controlling the operation of said oscillator tuning means, and the other path controlling the presence of said auxiliary sweep voltage.

3. In a circuit as set forth in claim 1, said oscillator tuning means comprising a rotary tuning condenser in the frequency determining circuit of said oscillator, and a motor connected to rotate said condenser at said slow rate.

4. In a circuit as set forth in claim 1, said auxiliary voltage comprising a sine wave adapted to sweep said reactance tube across at least part of its range of oscillator frequency control.

No references cited.